Nov. 14, 1967     T. R. KAUSEN     3,352,194
ELASTIC SAFETY NUT
Filed April 5, 1966
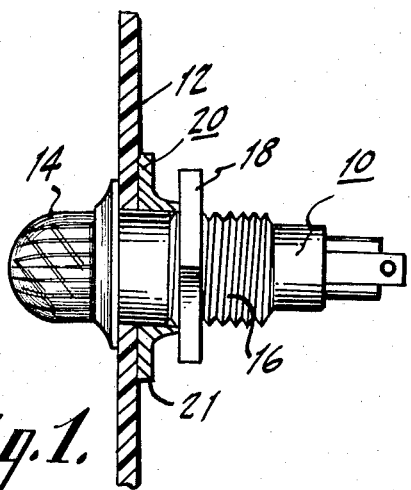
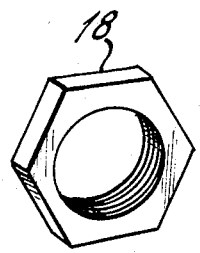
*Fig. 1.*     *Fig. 2.*
PRIOR ART
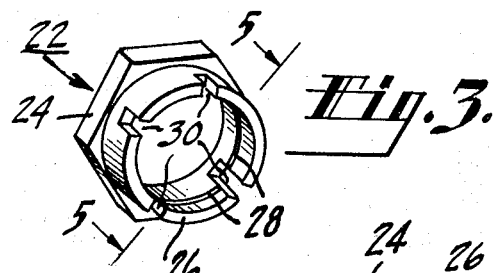
*Fig. 3.*
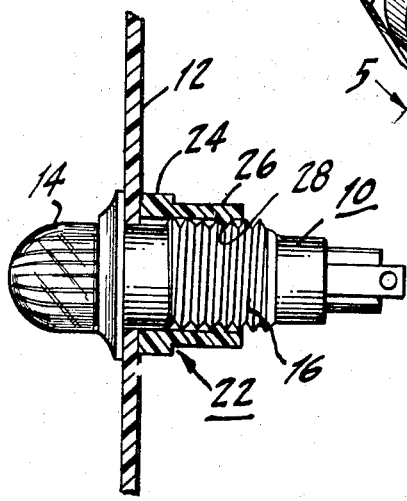
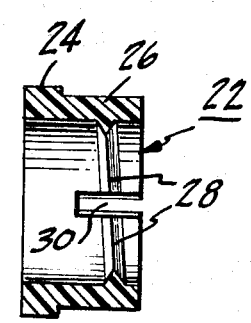
*Fig. 4.*     *Fig. 5.*
INVENTOR.
THEODORE R. KAUSEN
BY
Charles H. Brown
Attorney

United States Patent Office 3,352,194
Patented Nov. 14, 1967

3,352,194
ELASTIC SAFETY NUT
Theodore R. Kausen, Fort Lee, N.J., assignor to Industrial Devices, Inc., a corporation of New Jersey
Filed Apr. 5, 1966, Ser. No. 540,226
5 Claims. (Cl. 85—62)

ABSTRACT OF THE DISCLOSURE

A nut of plastic material comprising an annulus having a wrench grip and integral therewith an apron of plastic material provided with a plurality of longitudinal slots. The apron is provided with a single helical thread of plastic material in the form of a single turn which is interrupted by the slots. The ends of the helical thread are spaced from each other in the axial direction of the nut.

---

This invention comprises an elastic nut made from plastic material and of a construction to prevent damage to the part or element which it holds or secures to a panel.

The conventional nut is usually a metallic annulus of square or hexagonal section with an internal screw thread for use on a threaded bolt or screw for securing or fastening one element to another. The square or hexagonal periphery is a wrench grip for tightening or unscrewing the nut from the bolt or part which it engages.

When such a conventional nut is threaded upon a fragile plastic molded threaded socket for securing the socket to a panel, an overtightening of the nut may and often does result in the breakage of the threaded socket.

Summary of the invention

This problem of damage to or breakage of the fragile socket is overcome in accordance with the present invention by the provision of a one-piece nut of tough plastic material with some elasticity to it so that when the nut is over-torqued by a wrench, that is, tightened in excess of the force necessary for securely holding or fastening the socket to the panel, the nut will jump or pop over the rigid threads of the bolt or socket which it engages instead of destroying or wrecking itself or the fragile part which is to be fastened to the panel. The nut of the invention is a molded annulus which has some elasticity or resiliency and is formed from a tough synthetic plastic material, for example, nylon. The nut is provided with a wrench grip in the form of a plurality of equal-dimensioned flat surfaces, such as a hexagon, for tightening or unscrewing it from the bolt or socket which it threadedly engages. Projecting from the wrench grip and as an integral part of the one-piece nut of the invention, there is provided a plastic apron, or skirt-like flange, which has a plurality of slots therein, preferably equally spaced around the circumference of the apron. The number of slots is related to the amount of limiting torque required to tighten the plastic nut onto the threaded bolt or socket. An important feature of the nut of the invention is the single spiral or helical turn of molded tough synthetic plastic material positioned on the apron. The ends of the spiral or helical turn do not meet and are spaced from one another in the direction of the axial dimension of the nut. The pitch of the helical turn is designed to match the pitch of the threads on the mating bolt or socket which it will engage. If desired, the diameter of the single helical turn, when placed on the interior of the apron, may be somewhat smaller than the diameter of the threads on the mating bolt or socket.

Although the molded one-piece plastic nut of the invention is hereinafter described as an annulus having a wrench grip and an integral apron or skirt with the single helical thread on the interior of the apron, it should be understood that the nut may, for some purposes, be provided with a single helical turn exteriorly of the apron or flange.

A more detailed description of the invention follows in conjunction with a drawing, wherein:

FIGURE 1 is a sectional view of a known type of construction of a rigid though fragile plastic socket, such as Bakelite, secured or fastened to a panel by means of a conventional metal nut;

FIGURE 2 is a perspective view of the conventional nut used in FIGURE 1 to hold the socket firmly against the panel;

FIGURE 3 illustrates, in perspective, an embodiment of the molded one-piece plastic nut of the present invention;

FIGURE 4 is a sectional view of the molded plastic nut of the invention as it is employed to hold or secure a fragile socket to a panel; and FIGURE 5 is an enlarged view in cross-section of the molded plastic nut of FIGURE 3 taken along the line 5—5 of FIGURE 3.

Throughout the figures of the drawing the same parts are designated by the same reference numerals.

A known way of fastening a fragile though rigid plastic socket, made of Bakelite, for example, to a panel for use with electrical equipment is shown in FIGURE 1. The fragile socket 10 is inserted into a hole in the panel 12 such that the container 14 for the indicator lamp is positioned on one side of the panel while the main body portion of the socket including the rigid plastic threaded area 16 is positioned on the other side of the panel. The panel may be made of any suitable material such as a tough insulation board. For fastening or securing the socket 10 firmly to the panel 12 there is shown a conventional metal nut 18 having a plurality of rigid metal threads on the interior thereof for engaging the threads on the threaded area 16 of the fragile socket. Between the nut 18 and the panel 12 there is provided in FIGURE 1 a metallic sleeve 20 which loosely fits over the socket. This metallic sleeve is provided with a flange 21 which is forced against the panel 12 when the metallic nut 18 is tightened on the socket by a wrench.

One difficulty experienced with this known construction is that excess tightening of the nut 18 in fastening the socket to the panel will wreck the threads on the rigid plastic socket 10 and thus destroy the usefulness of the socket. This occurs when the nut 18 is over-torqued.

The molded plastic one-piece nut of tough elastic material of the present invention shown in FIGURES 3, 4 and 5 overcomes this difficulty. The molded nut 22 of the invention comprises a wrench grip part 24 having a plurality of equal-dimensioned flat surfaces integrally molded to a thinner but longer apron or skirt-like flange part 26. The interior of the hollow apron 26 is provided, preferably near its open end, with a single helical thread 28 of the same tough elastic material as the rest of the nut. This helical thread 28 is a single incomplete turn whose ends do not meet but are separated by the distance equal to the pitch of the thread. The single turn helical thread is interrupted by a plurality of slots 30 which are preferably equally spaced around the periphery of the apron. The number of slots 30 is related to the amount of limiting torque required to tighten the nut 22 on the fragile socket 10 for fastening the socket to the panel.

When the nut 22 of the invention is over-torqued by a wrench engaging the wrench grip part 24 of the nut, the nut 22 with its single helical thread 28 will pop over to the next thread on the rigid socket portion 16 and will not damage the socket. This is due to the elastic or resilient character of the molded plastic one-piece nut.

Among the factors which control the desired or limiting torque to be applied to the nut 22 are: (1) the number of slots 30, (2) the axial dimension of the apron 26, and (3) the thickness of the apron.

In one embodiment of the molded plastic nut of the invention, successfully constructed and tried out in practice, the material from which the one-piece nut was made was nylon, the wrench grip was hexagonal in shape and the apron was provided with six equally spaced slots. The apron had an axial dimension of approximately $3/16$ of an inch, an inner diameter of approximately $9/16$ of an inch and a thickness of approximately $3/32$ of an inch. The wrench grip had an axial dimension of approximately $5/64$ of an inch. Each of the six flat surfaces of the hexagonal wrench grip was approximately $15/32$ of an inch long. When such a nut is placed on the socket, there is no need for the metallic sleeve 20 of FIGURE 1, in order to securely fasten the socket to the panel.

The nut of the invention may be used on any threaded element where damage to associated elements or equipment is to be avoided when the nut is over-torqued.

What is claimed is:

1. A one-piece molded nut of tough synthetic elastic plastic material comprising an annulus having a wrench grip composed of a plurality of flat side surfaces and integral therewith a tubular apron of synthetic plastic material provided with a plurality of substantially equally spaced longitudinal slots extending completely through the walls of said apron from a free end thereof, said apron having a single helical thread of synthetic plastic material in the form of a single turn which is interrupted by said slots and whose two ends are spaced from each other in the axial direction of said nut.

2. A one-piece molded nut of tough elastic material in accordance with claim 1, wherein said slots extend substantially the full axial length of said apron.

3. A one-piece molded nut of tough elastic material in accordance with claim 1, wherein said single helical thread is positioned on the interior of said apron closer to the open end thereof than to said wrench grip.

4. A one-piece molded nut of tough elastic material as defined in claim 1, wherein the number of said slots is equal to the number of flat surfaces with each of said slots being substantially axially aligned with the center of one of the respective surfaces.

5. A one-piece molded nut of tough elastic material in accordance with claim 1, wherein the axial dimension of said apron is greater than the axial dimension of said wrench grip, and said wrench grip is thicker than said apron.

References Cited

UNITED STATES PATENTS

| | | |
|---|---|---|
| 96,873 | 11/1869 | Boorse. |
| 1,825,555 | 9/1931 | Stern. |
| 3,286,578 | 11/1966 | Fiddler _____ 151—7 |

CARL W. TOMLIN, *Primary Examiner.*

R. S. BRITT, *Assistant Examiner.*